United States Patent
Skopic (10) Patent No.: US 7,240,958 B2
(45) Date of Patent: Jul. 10, 2007

(54) APPARATUS FOR REDUCING DRAG ON UNPOWERED VEHICLES

(76) Inventor: Joseph Skopic, 61 Jacoby Dr., Bloomsberg, PA (US) 17815

(*) Notice: Subject to any disclaimer, the term of this patent is extended or adjusted under 35 U.S.C. 154(b) by 154 days.

(21) Appl. No.: 11/189,768

(22) Filed: Jul. 27, 2005

(65) Prior Publication Data

US 2007/0024087 A1 Feb. 1, 2007

(51) Int. Cl.
*B62D 35/00* (2006.01)
*B61D 17/00* (2006.01)

(52) U.S. Cl. .............................. 296/180.1; 296/180.4; 105/1.3; 180/903

(58) Field of Classification Search ............ 296/180.1, 296/180.2, 180.3, 180.4, 180.5; 105/1.3; 180/903
See application file for complete search history.

(56) References Cited

U.S. PATENT DOCUMENTS

| | | | |
|---|---|---|---|
| 1,871,396 A * | 8/1932 | Stalker | 296/180.1 |
| 2,243,906 A * | 6/1941 | Huet | 105/1.1 |
| 3,000,663 A * | 9/1961 | Lucchesi | 296/180.5 |
| 3,960,402 A * | 6/1976 | Keck | 296/180.4 |
| 3,999,797 A * | 12/1976 | Kirsch et al. | 296/180.4 |
| 4,257,640 A * | 3/1981 | Wiley | 296/180.3 |
| 4,309,053 A * | 1/1982 | Lett | 296/180.4 |
| 4,316,630 A * | 2/1982 | Evans | 296/180.2 |
| 4,320,920 A * | 3/1982 | Goudey | 296/180.4 |
| 4,421,354 A * | 12/1983 | Lemaster | 296/180.2 |
| 4,433,865 A | 2/1984 | Crompton, Jr. | |
| 4,451,074 A | 5/1984 | Scanlon | |
| 4,458,936 A | 7/1984 | Mulholland | |
| 4,508,380 A | 4/1985 | Sankrithi | |
| 4,674,788 A * | 6/1987 | Ohmura et al. | 296/180.5 |
| 4,688,841 A | 8/1987 | Moore | |
| 4,818,015 A | 4/1989 | Scanlon | |
| 4,878,707 A * | 11/1989 | Meyers | 296/91 |
| 5,199,762 A * | 4/1993 | Scheele et al. | 296/180.1 |
| 5,280,990 A | 1/1994 | Rinard | |
| 5,348,366 A | 9/1994 | Baker | |
| 5,375,903 A | 12/1994 | Lechner | |

(Continued)

FOREIGN PATENT DOCUMENTS

DE 4014577 C1 * 10/1991 ............... 296/152

(Continued)

*Primary Examiner*—D. Glenn Dayoan
*Assistant Examiner*—Paul Chenevert
(74) *Attorney, Agent, or Firm*—Kramer & Amado, P.C.; Terry W. Kramer (57) ABSTRACT

The present invention relates to an apparatus with flexible attachments for reducing drag on a vehicle having a generally planar rear surface. The use of flexible vane attachments allows the rear doors of the trailer to fully open and close effortlessly. The apparatus includes a pair of vanes, each vane having a leading edge and a trailing edge. A first flexible attachment member connects an upper end of each vane's leading edge to a side of said vehicle, while a second flexible attachment member connects a lower end of each leading edge to the vehicle side. At least one third flexible attachment member connects the trailing edge of each vane to the rear surface of the vehicle. Other additional cables may be needed for additional vane support depending on vane length and profile. The vanes redirect air flowing along the sides of the vehicle into a volume of low pressure air behind said rear surface.

25 Claims, 6 Drawing Sheets

U.S. PATENT DOCUMENTS

| | | |
|---|---|---|
| 5,498,059 A | 3/1996 | Switlik |
| 5,658,038 A | 8/1997 | Griffin |
| 5,823,610 A | 10/1998 | Ryan |
| 5,842,734 A | 12/1998 | Lechner |
| 6,257,654 B1 | 7/2001 | Boivin |
| 6,309,010 B1 | 10/2001 | Whitten |
| 6,485,087 B1 | 11/2002 | Roberge |
| 6,595,578 B1 | 7/2003 | Calsoyds |
| 6,666,498 B1 | 12/2003 | Whitten |
| 6,799,791 B2 | 10/2004 | Reiman |
| 2002/0021023 A1 | 2/2002 | Leban |
| 2002/0030384 A1 | 3/2002 | Basford |
| 2003/0011210 A1 | 1/2003 | Cory |
| 2003/0038508 A1 | 2/2003 | Fairburn |
| 2003/0205913 A1 | 11/2003 | Leonard |
| 2004/0119319 A1 | 6/2004 | Reiman |

FOREIGN PATENT DOCUMENTS

| | | | | |
|---|---|---|---|---|
| DE | 4237458 A1 | * | 5/1994 | ................ 296/152 |
| JP | 60146747 A | * | 8/1985 | ................ 296/91 |
| JP | 63-180575 | | 7/1988 | |
| JP | 02-290788 | | 11/1990 | |
| JP | 06-016157 | | 1/1994 | |

* cited by examiner

APPARATUS FOR REDUCING DRAG ON UNPOWERED VEHICLES

BACKGROUND OF THE INVENTION

1. Field of the Invention

The invention relates generally to devices for reducing air flow resistance and drag on trucks, semitrailers, railway cars, and other vehicles. More particularly, the invention relates to devices for redirecting air from airstreams passing around a vehicle into low-pressure zones at the rear of the vehicle.

2. Description of the Prior Art

The profitability of long-distance highway cargo transport depends heavily on the cost of fuel, and on the efficiency with which the fuel is utilized. The cost of fuel is largely outside the control of the cargo transporter; however, the efficiency of fuel utilization may be increased. One method involves reducing resistance to forward motion of a vehicle through the air. Resistance to vehicular motion takes two major forms. First, the volume of air immediately in front of the vehicle acts as a barrier. A vehicle is then required to expend energy to push this volume of air aside, thereby reducing fuel economy. Significant advances have been made in aerodynamic design of semitrailer tractors and trailers, including the incorporation of deflectors to redirect air around substantially vertical planar surfaces of vehicles. A commonly used deflector takes the form of a dome-shaped device mounted on the top of a semitrailer tractor cab; the dome deflects air upward toward the top of the trailer, rather than allowing the air to flow directly against the vertical front of the trailer. Resistance to forward motion of the vehicle from the body of air in front of the vehicle is reduced. A measurable increase in the efficiency of fuel utilization, and a concomitant increase in mileage traveled per gallon of fuel used (fuel mileage), is obtained.

A second, and at least equally pernicious, form of resistance to a vehicle in motion lies in the drag on the vehicle caused by the formation of reduced-pressure zones at the rear of the vehicle, or in between units of a combination vehicle, such as a string of multiple trailers. The airstreams passing over the top and along the sides of the vehicle recombine behind of the vehicle. However, due to turbulence caused by the passage of the vehicle, a space filled with low pressure air forms between the rear of the vehicle and the point at which these airstreams fully recombine. This zone of turbulent low-pressure air acts as a partial vacuum, and induces drag on the vehicle in a backward direction. The work that must be performed by the engine to pull the vehicle forward is then increased, thereby decreasing fuel mileage.

Vehicular drag has long been recognized in the art, and a number of solutions have been proposed. One common solution lies in streamlining the rear of a trailer. Airstreams passing along the trailer flow together more smoothly, with reduced turbulence. A smaller low-pressure zone is produced at the rear of the vehicle, with a marked reduction in drag. However, a number of legacy trailers exist; which would require a sizable expense to replace. Accordingly, methods of reducing drag which may be easily and inexpensively retrofitted onto existing trailers would be attractive to trucking companies.

One method of retrofitting existing trailers with streamlined drag-reduction devices lies in the use of conical or pyramidal devices or airfoils on the rear of a trailer. Such airfoils act in the same manner as the streamlined rear of a trailer as described above, in that the airfoils allow airstreams to flow together more smoothly. An advantage over the above streamlined trailers is that airfoils may be readily retrofitted onto an existing, non-streamlined, trailer. However, these devices do have certain drawbacks. When used with trailer trucks, airfoils normally fit over the doors at the rear of the trailer. Thus, these devices may not be simply mounted on a trailer and left in place. Instead, these devices must be assembled and mounted on the rear of the trailer after completion of the loading process. Similarly, such devices must be disassembled and removed from the trailer before unloading can begin, causing inconvenient delays in the unloading and loading processes. More importantly, at least some of the savings from increases in fuel mileage or fuel economy may be offset by increased hourly costs for labor. Another drawback of using rear-mounted airfoils on trailers is that the airfoils add significantly to the length of a trailer, making it difficult to use these airfoils to reduce drag in between a pair of trailers mounted in series.

Some airfoil designs allow the airfoils to slide into or out of tracks mounted on the side of the vehicle; while the use of such tracks accelerates the process of positioning airfoils after loading and unloading the trailer, the cost and complexity of retrofitting an existing trailer with a streamlined airfoil is significantly increased.

A second method of retrofitting trailers with a drag-reducing device lies in fitting vanes to the rear corners of the trailers. Corner vanes redirect airstreams passing along the sides of the vehicle to induce flow into a low-pressure zone behind the trailer, thereby reducing the magnitude of the partial vacuum behind the trailer, and hence reducing the drag on the vehicle. If two trailers are connected in series, formation of a low pressure zone between the trailers may be prevented by mounting vanes to the rear of the front trailer, such that air flowing along a front trailer is redirected into the space between the front trailer and rear trailer.

Many vanes of the prior art are rigidly mounted to the rear corners of a trailer. While these do an effective job of preventing drag, they do impede opening the doors on the rear of the trailer. Many trailers are designed with doors that open so as to lie flat against the side of the trailer, so as to allow the trailer to be loaded or unloaded in a small or enclosed space. However, the vanes, when rigidly mounted to the trailer, prevent the doors from opening completely. The inability to fully open the vehicle doors is an inconvenience during the loading/unloading process.

It is an object of the invention to provide an apparatus that will increase fuel efficiency of powered vehicles towing unpowered vehicles having a generally planar rear surface by reducing drag on the unpowered vehicles.

Another object of the invention is to provide an apparatus that may be retrofitted onto existing vehicles so as to reduce drag, without requiring that the apparatus be dismounted or remounted at any point during the unloading/reloading process.

In another object of the invention, the drag-reducing apparatus may be retrofitted onto existing vehicles without impeding the normal uses of the vehicles. These normal functions include, but are not limited to, the ability to fully open the doors of the vehicles during loading/unloading; and the ability to connect multiple vehicles in series.

It is an additional object of the invention to provide an apparatus that will reduce drag on vehicles having a generally planar rear surface, including trailers and railway cars.

It is a further object to provide an apparatus that will reduce drag on vehicles, where the device may be readily retrofitted onto existing vehicles.

The foregoing objects and advantages of the invention are illustrative of those that can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In light of the present need for an improved drag reduction apparatus for a vehicle, a brief summary of the present invention is presented. Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

According to the present invention, reduction of drag arising from creation of a low pressure volume of turbulent air behind a generally planar rear surface of a vehicle is provided by attaching a pair of vanes to the right and left corner edges of the rear surface of the vehicle. Such vanes typically extend through substantially the full vertical height of the rear structure of the vehicle. Each vane is bent about a longitudinal center line so that the vane curves around the corner edge to which it is attached, and is positioned so that a leading edge of the vane projects beyond the width of the rear surface structure. The trailing edge of the vane is behind the rear surface of the vehicle. As the vehicle moves in a forward direction, the leading edges of the vanes capture a portion of the air streams flowing along the sides of the vehicle, and deflect the air streams into the low pressure volume of turbulent air behind the vehicle, increasing the pressure within this volume of air, and reducing its ability to exert drag on the vehicle by acting as a partial vacuum.

The vanes are attached to the rear vertical edges of the vehicle by a set of flexible attachment elements, such as cables. These cables include at least a pair of cables attached to the leading edge of each vane. One of these cables is attached to the upper end of the leading edge of each vane, and connects each vane to an upper portion of a side of the vehicle. Another cable is attached to the lower end of the leading edge of each vane, and connects this lower vane end to a lower portion of the side of the vehicle. One vane is attached to the right side of the vehicle, and one vane is attached to the left side of the vehicle. The trailing edges of the right and left vanes are attached to the planar rear surface of the vehicle by means of one or more cables. For example, the trailing edges can be connected together by a single cable which is connected to a vane at each end, and anchored to the rear surface of the vehicle in the middle. Alternatively, each trailing edge can be anchored to the rear surface of the vehicle by a separate cable. Attachment of vanes to the rear surface using separate cables is preferable if the vehicle has doors in its rear surface. For example, a cable can be used to anchor the trailing edge of the right vane to a right door in the rear surface of the vehicle, and the trailing edge of the left vane can be anchored to a left rear door of the vehicle.

The invention is additionally directed to a method of modifying a vehicle having a substantially planar rear surface so as to reduce drag on the vehicle. This method involves the use of vanes having a leading edge and a trailing edge. The leading edge of a first vane is connected to a rear vertical edge of a first side of said vehicle by means of at least one first flexible attachment means. This flexible attachment means may take the form of a set of two or more cables connecting the leading edge of the first vane to the first side of the vehicle. Alternatively, the length of the leading edge of the vane may be anchored to a flexible mesh which is connected to the first side of the vehicle. The trailing edge of the first vane is then connected to the rear surface of the vehicle by means of at least one second flexible attachment means, such as a cable or a mesh. The leading and trailing edges of a second vane are similarly connected to a rear vertical edge of a second side of said vehicle. These vanes reduce drag on the vehicle by redirecting air flowing along the first and second sides of the vehicle into a volume of low pressure air behind the rear surface of the vehicle as the vehicle moves forward.

BRIEF DESCRIPTION OF THE DRAWINGS

In order to better understand the present invention, reference is made to the accompanying drawings, wherein.

DETAILED DESCRIPTION OF THE INVENTION

Figure 1:
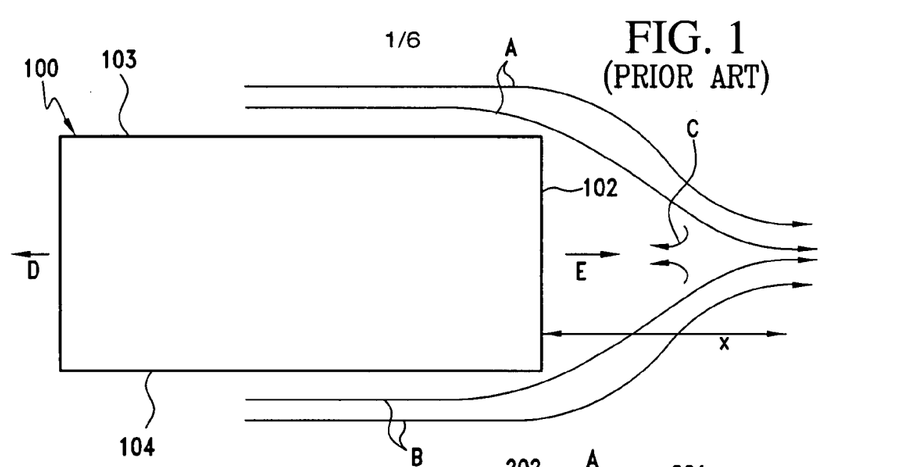
FIG. 1 shows the pattern of air flow around a vehicle having a generally planar rear surface, and illustrates how drag forces arise.

FIG. 1 shows airflow around a vehicle 100, such as a trailer or a railroad car, having a generally planar rear surface 102, a right side 103, and a left side 104, when vehicle 100 moves in a forward direction D at a desired speed. Under these conditions, air moves, relative to vehicle 100, along the sides 103 and 104 in the direction of arrows A and B, respectively. The flow of air in the direction A and the flow of air in the direction B do not reunite immediately behind rear surface 102; rather, airflows A and B reunite at a point at a certain distance X behind surface 102. A zone of low pressure air is thereby created behind rear surface 102, between the flow of air in the direction A and the flow of air in the direction B. This low pressure zone acts as a partial vacuum, and sucks air from air flows A and B in the direction of arrows C, into the zone of low pressure air. Airflow in the direction of arrows C somewhat increases the air pressure behind surface 102, but also increases the turbulence in this volume of air. As a result, as the vehicle moves forward in the direction of arrow D, a partial vacuum containing a volume of turbulent low pressure air is carried behind vehicle 100. This partial vacuum creates drag on the vehicle by sucking in the direction of arrow E on surface 102. The engine causing the vehicle to move forward must work harder to cause the vehicle to move at the desired speed in direction D while simultaneously overcoming the retarding force of drag in the direction of arrow E.

Figure 2:
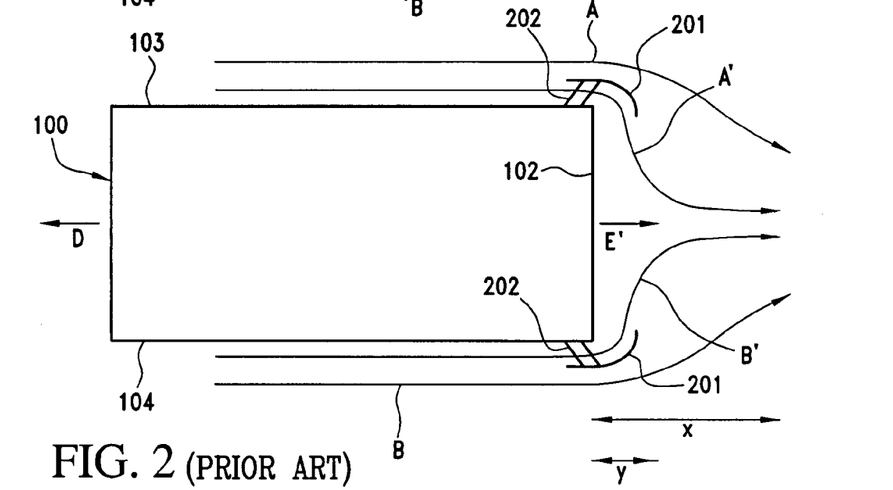
FIG. 2 shows the use of vanes to modify the pattern of air flow around a vehicle having a generally planar rear surface so as to reduce the magnitude of drag forces.

FIG. 2 shows a prior art method of reducing drag on a vehicle by connecting vanes 201 to the rear of the vehicle using brackets 202. When vehicle 100 moves in a forward direction D, a leading edge of a first vane 201 captures a portion of the airflow in direction A along right side 103, and the trailing edge of the first vane redirects the captured airflow in a new direction A'. The other vane 201 redirects a portion of the airflow in direction B along left side 104 in a new direction B' in a similar fashion. The remainder of the airflows in directions A and B proceed as described above, reuniting at distance X behind surface 102 and forming a low pressure zone of air. The airflows in direction A' and direction B', after leaving vanes 201, flow directly into this zone of low pressure air behind surface 102, and reunite at a distance Y behind surface 102, where distance Y is less than distance X. This increases the air pressure behind surface 102, and reduces the extent of the drag exerted on the vehicle in the direction of arrow E' by the partial vacuum.

Figure 3:
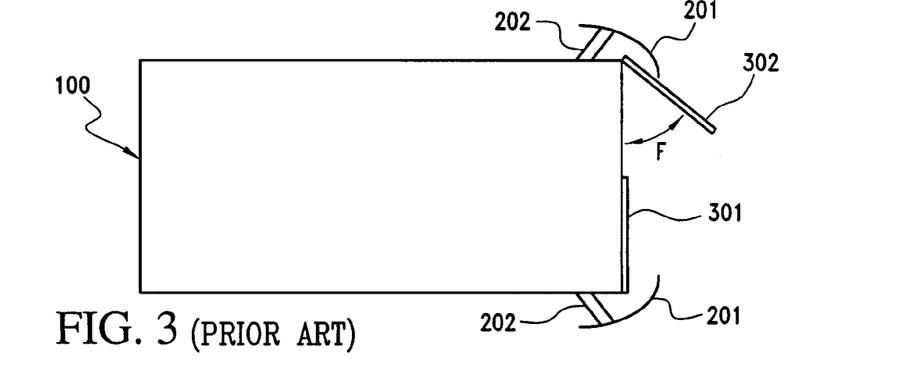
FIG. 3 shows how prior art vanes interact with a set of doors on the rear surface of a vehicle.

FIG. 3 shows prior art vanes 201 attached to the rear edges of vehicle 100, where vehicle 100 has doors 301 and 302 in its rear surface. The vanes are attached using rigid brackets 202 to hold the vanes in position. Vanes which have been rigidly attached in this fashion can cause problems when the vehicle doors are opened. These doors typically swing open in the direction of arrow F to facilitate loading and unloading of the vehicle. When vanes 201 are rigidly held in position by brackets 202, the vanes prevent the door from fully opening in the direction of arrow F, complicating the loading/unloading process.

Figure 4:
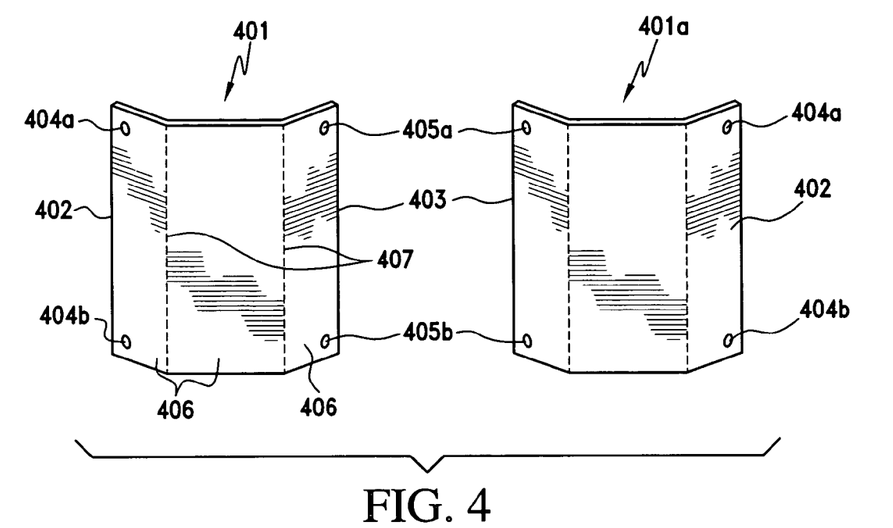
FIG. 4 shows a set of vanes for reduction of drag, as described in the current invention.

FIG. 4 shows a system of vanes including a left vane 401 and a right vane 401a. These vanes may be mounted to a vehicle so as overcome drag on the vehicle without impeding normal operation of the vehicle doors. Each of vanes 401 and 401a includes a leading edge 402 and a trailing edge 403. In one embodiment, a hole 404a for connecting a cable or other flexible connector is positioned at the top of each leading edge 402, and a corresponding connection hole 404b is positioned at the bottom of each leading edge 402. Similarly, a connection hole 405a is positioned at the top of each trailing edge 403, and a corresponding hole 405b is positioned at the bottom of each trailing edge 403. Each vane is bent longitudinally to form an inner concave surface and an outer convex surface. The vanes may be curved into a smooth arc when viewed in cross section. Alternatively, each vane may be bent into three or more planar regions 406 meeting at obtuse angles 407, as seen in FIG. 4.

Figure 5:
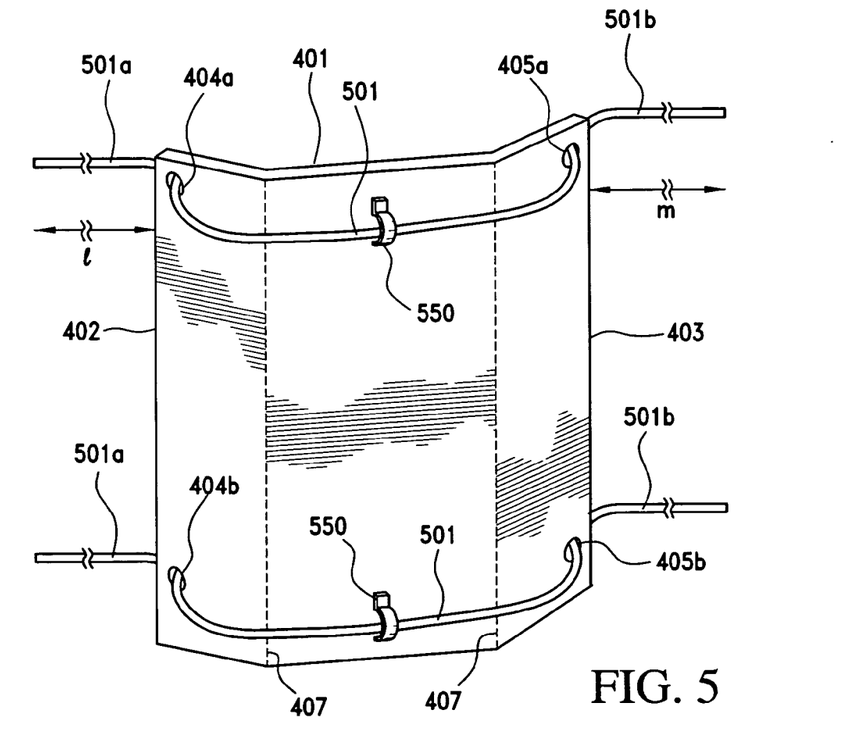
FIG. 5 shows a first method of connecting a series of two cables to a vane of the current invention.

FIG. 5 shows a method of attaching a set of two cables to left vane 401. In one embodiment, a cable 501 is connected to the upper end of vane 401 by running the cable from the inner surface of the vane through hole 404a in the upper end of the leading edge of the vane. Cable 501 then runs through hole 405a in the upper end of the trailing edge of the vane. The portion of cable 501 wrapping around the convex surface of the vane is then secured in position so that the vane does not move relative to the cable by means of a clamp or a staple 550. In an analogous way, a second cable 501 is connected to the lower end of vane 401 by using holes 404b and 405b. After this second cable 501 is connected, the vane 401 has two lengths of cable 501a of length l extending from its leading edge, and two lengths of cable 501b of length m extending from its trailing edge 403. Preferably, length m is greater than length l. In exactly the same manner, two lengths of cable 501a are connected to the leading edge of right vane 401a, and two lengths of cable 501b are connected to the trailing edge of right vane 401a. A loop 901 is formed at the end of each cable 501a and each cable 501b, as can best be seen in FIG. 9.

Figures 6, 7:
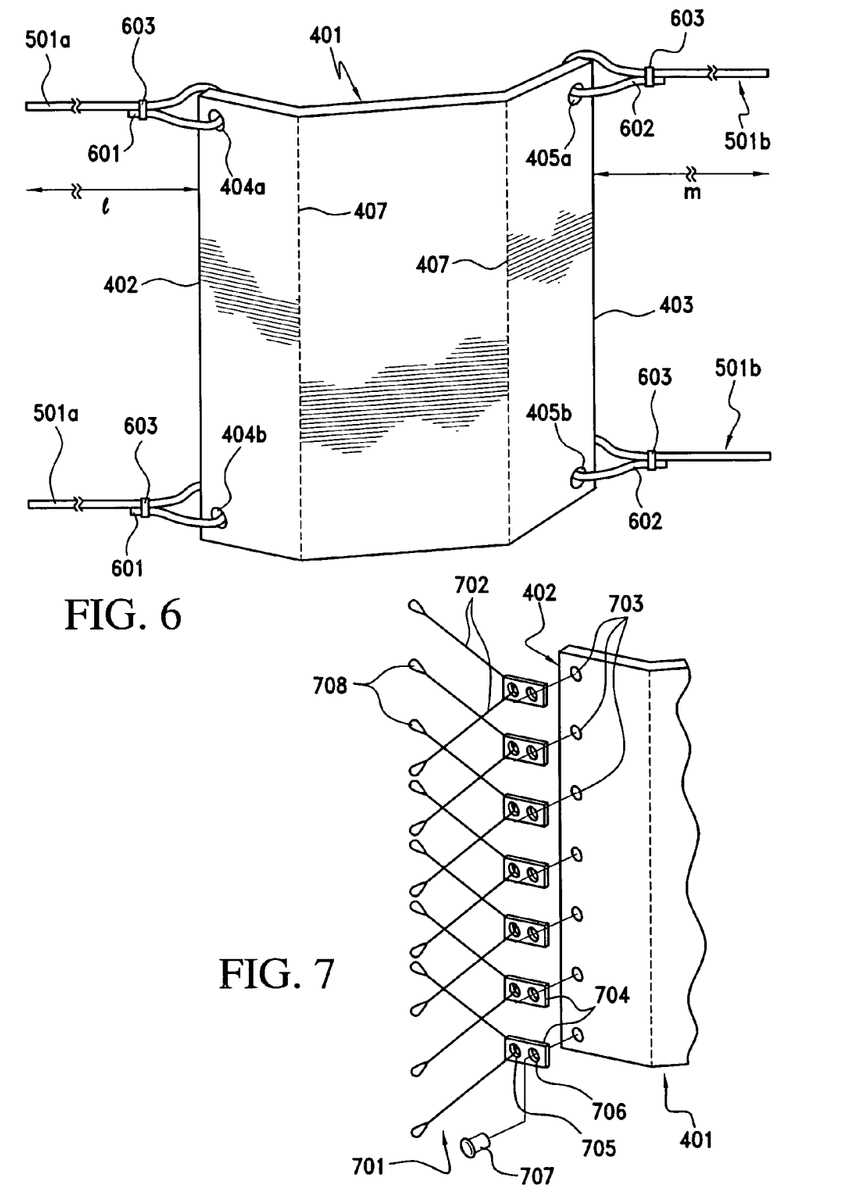
FIG. 6 shows an alternative method of connecting a series of four cables to a vane of the current invention.
FIG. 7 shows a method of connecting a mesh connector to a vane of the current invention.

FIG. 6 shows another method of connecting a set of four separate cables to left vane 401 by looping an end 601 of a cable 501a of length l through each of holes 404a and 404b in the leading edge of the vane, and similarly looping an end 602 of a cable 501b of length m through each of holes 405a and 405b in the trailing edge of the vane. Each loop is secured by clamping the free end of the cable to the main length of the cable with clamp 603. In exactly the same manner, four cables are connected to the right vane.

FIG. 7 shows use of a flexible mesh 701, which is secured to the leading edge 402 of vane 401. The mesh is formed so that air may freely flow through the spaces in the mesh. The cords or cables 702 forming mesh 701 may be secured to the edge 402 by directly passing these cables through a series of holes 703 in vane 401. Alternatively, a series of connectors 704, each having a first hole 705 and a second hole 706, may be connected to mesh 701 by looping cables 702 through holes 705, and then securing connectors 704 to vane 401 by means of rivets 707 passing through holes 706 in connectors 704 and through holes 703 in vane 401 (For reasons of clarity, only one rivet is shown in FIG. 7). A loop 708 is then formed at either end of each cable 702; at points where two cables 702 cross when forming the mesh, cables 702 may be secured together. The use of connectors 704 and rivets 707 is useful for connecting preformed meshes to vanes. A second mesh may be similarly connected to the trailing edge 403 of vane 401.

Whatever method is used to connect cables or meshes to left vane 401, cables or meshes should be similarly connected to right vane 401a.

Figure 8:
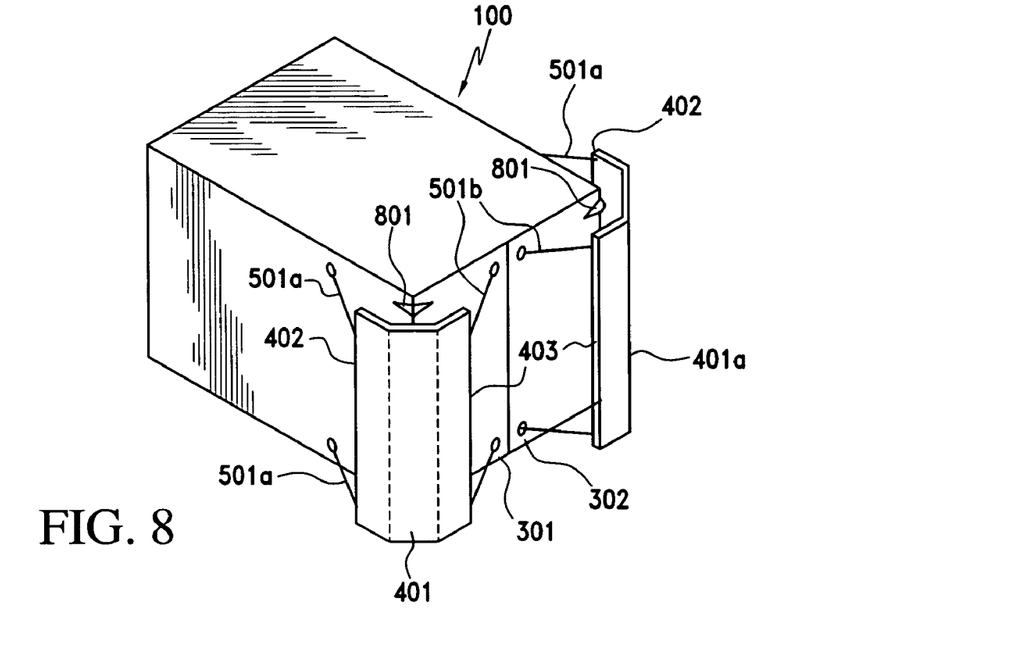
FIG. 8 shows the vanes of FIG. 4 connected to a vehicle having a generally planar rear surface with right and left rear doors.
Figure 9:
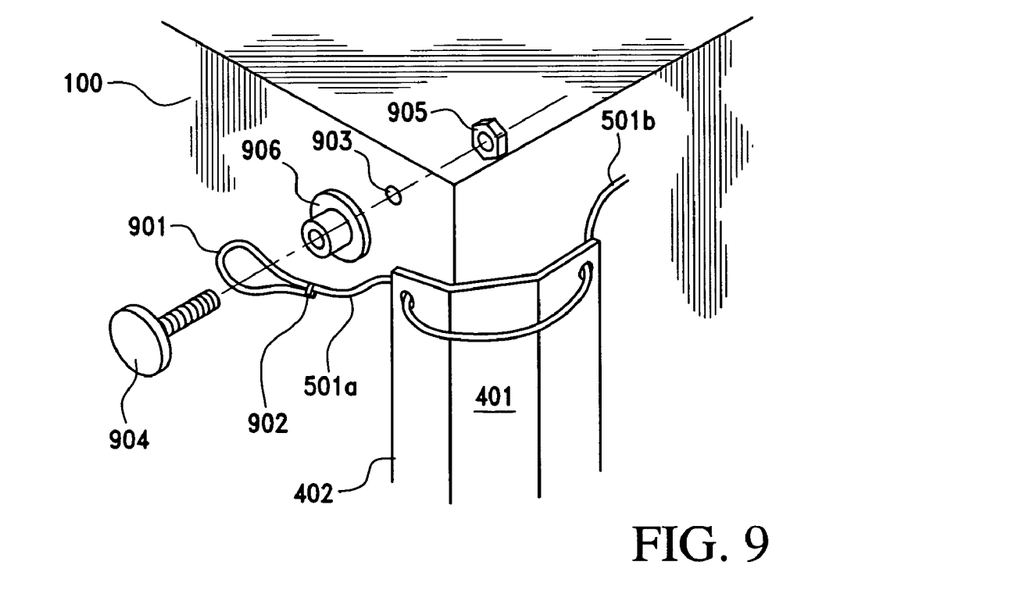
FIG. 9 provides an exploded view showing a method of connecting a vane to a vehicle by means of a flexible cable.

FIG. 8 and FIG. 9 illustrate the manner in which the vanes of FIG. 5 and FIG. 6 are attached to the vehicle. This method may be performed on new vehicles or used to retrofit existing vehicles with vanes 401 and 401a with equal facility. As shown in FIG. 8, vehicle 100 has a left rear door 301 and a right rear door 302, which are connected to the right and left sides of the vehicle, respectively, by means of hinges 801. With the doors in a closed position, the vanes are attached to the vehicle by connecting the leading edge of left vane 401 to the left side of the vehicle by fastening cables 501a to the left side of vehicle 100. Similarly, the leading edge of right vane 401a is connected to the right side of the vehicle using cables 501a. The trailing edges of vanes 401 and 401a are then connected to the left and right rear doors, respectively, using cables 501b. The cables are connected to vehicle 100 as shown in FIG. 9, which illustrates connection of cable 501a extending from the upper end of the leading edge of vane 401; all cables 501a and 501b are connected similarly (Please note that the top of vehicle 100 is not shown in FIG. 9, for reasons of clarity.). A loop 901 is formed at the end of each cable 501a and secured with a clamp 902 so that loop 901 may be positioned over grommet 906. A hole 903 is then drilled in the side of vehicle 100, and the cable loop 901 is secured to the vehicle by passing a bolt 904 through grommet 906 and hole 903, and securing the bolt in position using nut 905. The head of bolt 904 must be larger than loop 901. The grommet must be positioned with the largest diameter surface flat against the side of vehicle 100. After assembly, check to be sure the flexible cable rotates freely and the loop cannot slip over the bolt head. The free rotation of the flexible cables around the grommets is critical in allowing the vanes to be positioned properly when the doors are fully opened. This exact assembly installation procedure is used on all fastened connections to both sides and the doors of the vehicle 100.

Since cables 501 and 501b are flexible, when vehicle 100 is stationary and doors 301 and 302 are closed, vanes 401 and 401a tend to hang loosely from cables 501a and 501b, and rest against the rear corner edges of vehicle 100.

Figure 10:
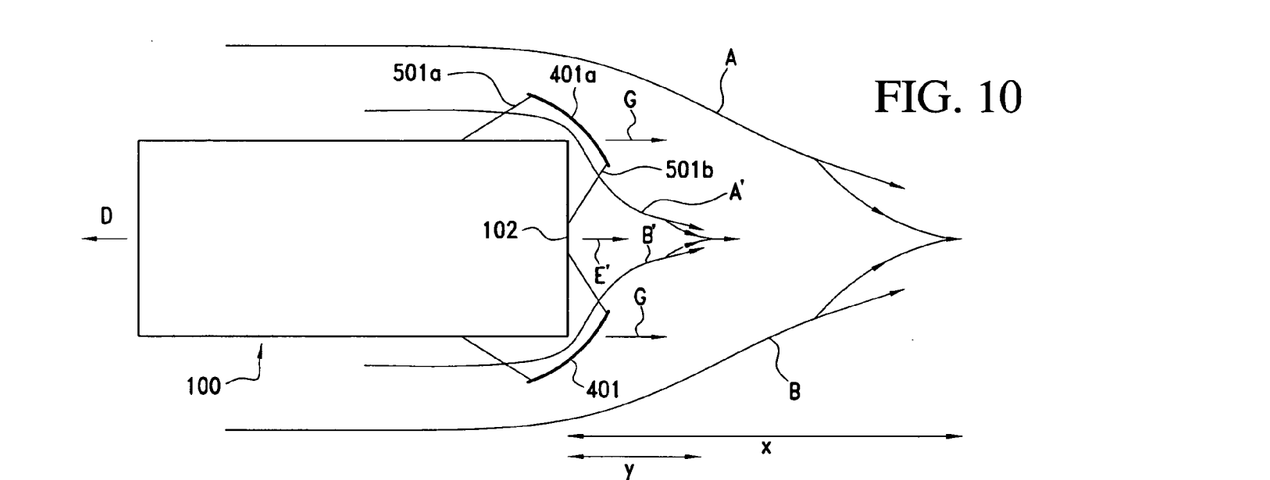
FIG. 10 shows the pattern of air flow around a vehicle of FIG. 8 having vanes as described in the current invention attached thereto.

FIG. 10 shows vehicle 100 in motion in the direction of arrow D; under such conditions, the leading edges of vanes 401 and 401a capture a portion of the air flowing along the right and left sides sides of the vehicle in the direction of arrows A and B, creating a zone of comparatively high-pressure air in front of the concave inner surfaces of vanes 401 and 401a. The remainder of the airflows along the sides of the vehicle recombine at a distance X behind the rear surface of the vehicle, creating a zone of low-pressure air behind the vehicle's rear surface 102, as well as behind the convex outer surfaces of vanes 401 and 401a. The pressure difference between the inner and outer surfaces of vanes 401 and 401a creates lift in the direction of arrows G, causing the vanes to move away from the body of vehicle 100. The vanes then cause the captured air to flow in the direction of arrows A' and B', into the zone of low pressure air behind rear surface 102, with the captured airflows in the direction of arrows A' and B' reuniting at a distance Y behind surface 102, where Y is less than X. The flow of air into the zone of low pressure air decreases the magnitude of the partial vacuum behind the vehicle 100, thereby reducing the consequent suction force or drag on rear surface 102 of vehicle 100 in the direction of arrow E'. The reduction in drag significantly reduces the work that must be done to cause the vehicle to move forward at a desired velocity, leading to an increase in the efficiency of fuel utilization. Proper use of the vanes of this invention may increase fuel efficiency by 5% or more, relative to a similar vehicle which has not been fitted with vanes.

Figure 11A:
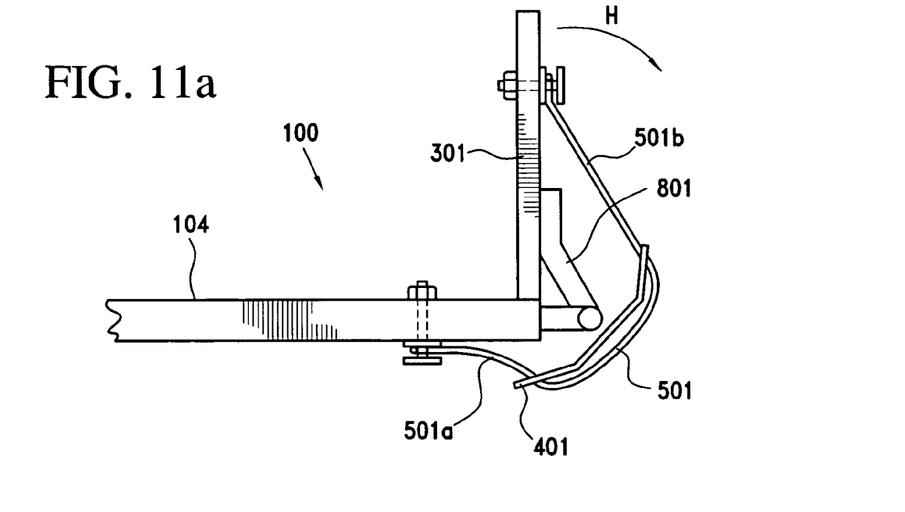
FIGS. 11a, 11b, and 11c show the effect of opening the rear door of a vehicle having vanes as described in the current invention attached thereto on the positioning of the vanes.
Figure 11B:
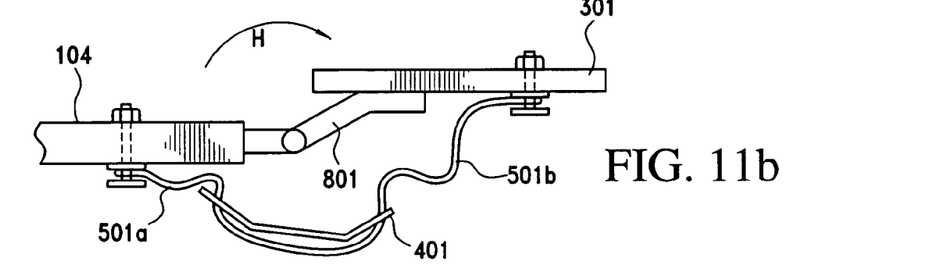
Figure 11C:
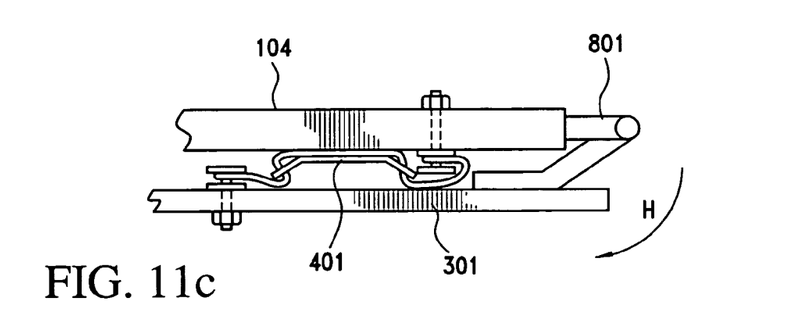

As shown in FIG. 11a, FIG. 11b, and FIG. 11c, the vanes 401 and 401a of this invention, when mounted using flexible mesh materials or a set of flexible cables, have the further benefit that the vanes 401 and 401a do not impede opening of the left and right rear doors 301 and 302, unlike prior art vanes mounted using rigid brackets. The flexible nature of cables 501a and 501b allows the vane to fold back out of the way as door 301 opens. In FIG. 11a, vane 401 is secured to door 301 using cables 501b, and to side 104 of vehicle 100 using cables 501a. The inner surface of vane 401 lies over hinge 801, with the leading edge of the vane extending over side 104 of the vehicle, and the trailing edge of the vane extending over door 301. As door 301 swings in the direction of arrow H, the trailing edge of vane swings away from the vehicle, until when the door 301 has swung 90° and is roughly coplanar with side 104 of vehicle 100 (FIG. 11b), a hypothetical line connecting the leading and trailing edges of vane 401 is roughly parallel to vehicle side 104. As door 301 continues to swing in the direction of arrow H (FIG. 11c), the outer surface of vane 401 folds back against wall 104 of the vehicle, allowing the door 301 to be fully opened.

The ability of the vanes to fold against wall 104 greatly facilitates loading and unloading of the vehicle. It also reduces operator costs for labor, as there is no need to pay workers for time spent mounting and dismounting vanes during the loading/unloading process.

Figure 12:
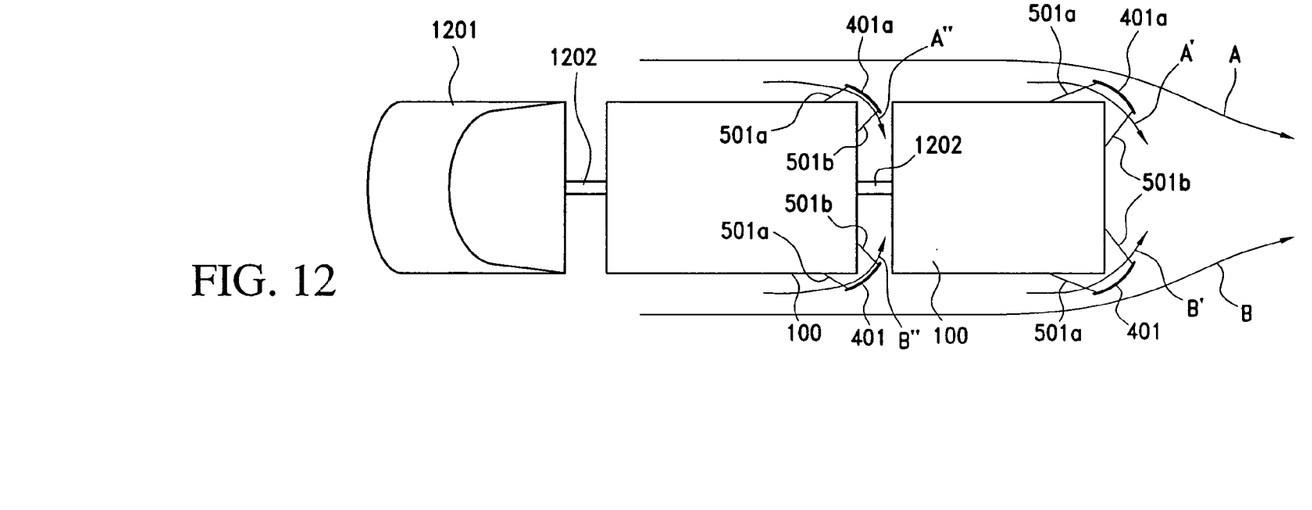
FIG. 12 shows the pattern of air flow around a multiple vehicles connected in series, each having vanes as described in the current invention attached thereto.

FIG. 12 shows that the current invention is also of great utility when two unpowered vehicles 100, such as trailers, are towed in series behind a powered vehicle 1201, such as a truck cab, using trailer hitches 1202. Vehicles 100 will be assumed to be trailers in the following discussion. Vanes 401 and 401a may be mounted on the rear of each vehicle 100 using cables 501a and 501b. The vanes on the rear vehicle 100 act to redirect airflow in the direction of arrows A and B into the direction of arrows A' and B', as described above, thereby reducing drag on the rear trailer. The vanes on the front trailer 100 also act to reduce drag. As air flows in the direction of arrows A and B past the space between the two trailers 100, a low pressure zone is created between the trailers. The partial vacuum in this low pressure zone exerts a retarding force, or drag, on the leading trailer. The vanes mounted on the leading trailer a portion of the airflows A and B into the space between the trailers, in the direction of arrow A" and B", thereby increasing the air pressure in the space between the two trailers 100, and thus reducing the drag on the leading trailer.

While the foregoing discussion is primarily directed to unpowered vehicles being towed behind a separate, powered vehicle, the invention is not limited to such a configuration. It may equally well be applied to any powered vehicle having a substantially planar rear surface.

Although the present invention has been described in detail with particular reference to preferred embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A drag-reducing apparatus comprising:
    a vane having a leading edge and a trailing edge;
    a first pliant attachment means connecting an upper end of said leading edge to a side of a vehicle having a generally planar rear surface;
    a second pliant attachment means connecting a lower end of said leading edge to a side of said vehicle having a generally planar rear surface; and
    at least one third pliant attachment means connecting said trailing edge to a rear surface of said vehicle having a generally planar rear surface;
    wherein said vane redirects air flowing along said side of said vehicle into a volume of low pressure air behind said rear surface.

2. An apparatus for reducing drag on a vehicle having a generally planar rear surface, said apparatus comprising:
    a vane having a leading edge and a trailing edge;
    a first flexible pliant attachment means connecting an upper end of said leading edge to a side of said vehicle;
    a second flexible pliant attachment means connecting a lower end of said leading edge to a side of said vehicle; and
    at least one third flexible pliant attachment means connecting said trailing edge to said rear surface of said vehicle;

wherein said vane redirects air flowing along said side of said vehicle into a volume of low pressure air behind said rear surface.

3. The apparatus of claim 2, wherein:
said first flexible attachment means comprises a first bolt connected to said side of said vehicle, and a first cable running from said first bolt to said upper end of said leading edge; and
said second flexible attachment means comprises a second bolt connected to said side of said vehicle, and a second cable running from said second bolt to said lower end of said leading edge.

4. The apparatus of claim 3, wherein said at least one third flexible attachment means comprises a first rear attachment means and a second rear attachment means;
said first rear attachment means being connecting an upper end of said trailing edge to said rear surface of said vehicle; and
said second rear attachment means being connecting a lower end of said trailing edge to said rear surface of said vehicle.

5. The apparatus of claim 4, wherein:
said first rear attachment means comprises a third bolt connected to said rear surface of said vehicle, and a third cable running from said third bolt to said upper end of said trailing edge; and
said second rear attachment means comprises a fourth bolt connected to said rear surface of said vehicle, and a fourth cable running from said fourth bolt to said lower end of said trailing edge.

6. The apparatus of claim 2, wherein there is a door in said rear surface of said vehicle, and said at least one third flexible attachment means is connecting said trailing edge to said door.

7. The apparatus of claim 6, wherein:
said at least one third flexible attachment means comprises a first rear attachment means and a second rear attachment means;
said first rear attachment means being connecting an upper end of said trailing edge to said door; and
said second rear attachment means being connecting a lower end of said trailing edge to said door.

8. An apparatus for reducing drag on a vehicle having a generally planar rear surface, said apparatus comprising:
a first vane having a leading edge and a trailing edge;
a second vane having a leading edge and a trailing edge;
a first flexible pliant attachment means connecting an upper end of said leading edge of said first vane to a right side of said vehicle and an upper end of said trailing edge of said first vane to said rear surface of said vehicle;
a second flexible pliant attachment means connecting a lower end of said leading edge of said first vane to a right side of said vehicle and a lower end of said trailing edge of said first vane to said rear surface of said vehicle;
a third flexible pliant attachment means connecting an upper end of said leading edge of said second vane to a left side of said vehicle and an upper end of said trailing edge of said second vane to said rear surface of said vehicle; and
a fourth flexible pliant attachment means connecting a lower end of said leading edge of said second vane to a left side of said vehicle and a lower end of said trailing edge of said second vane to said rear surface of said vehicle;

wherein said first and second vanes redirect air flowing along said right and left sides of said vehicle into a volume of low pressure air behind said rear surface.

9. The apparatus of claim 8, wherein:
said first and second flexible attachment means are connecting said trailing edge of said first vane to a door in the right side of said rear surface of said vehicle; and
said third and fourth flexible attachment means are connecting said trailing edge of said second vane to a door in the left side of said rear surface of said vehicle.

10. An apparatus for transporting cargo with decreased drag, comprising:
a vehicle adapted to carry cargo, said vehicle having a right side, a left side, and a generally planar rear surface;
a first vane having a leading edge and a trailing edge;
a second vane having a leading edge and a trailing edge;
a first flexible pliant attachment means connecting said leading edge of said first vane to said right side of said vehicle;
a second flexible pliant attachment means connecting said leading edge of said second vane to said left side of said vehicle; and
at least two third flexible pliant attachment means connecting said trailing edges of said first and second vanes to said rear surface of said vehicle;
wherein said first and second vanes reduce drag on said vehicle by redirecting air flowing along said right and left sides of said vehicle into a volume of low pressure air behind said rear surface.

11. The apparatus of claim 10, wherein said vehicle comprises a generally planar rear surface having a door in a right side thereof, and door in a left side thereof; and
wherein said at least two third flexible attachment means comprises a first rear attachment means connecting said trailing edge of said first vane to said right door in said rear surface, and a second rear attachment means connecting said trailing edge of said second vane to said left door in said rear surface.

12. The apparatus of claim 11, wherein the right and left doors are hinged to said rear surface of said vehicle; and
the first and second vanes are connected to said right and left doors without hindering movement of said doors.

13. The apparatus of claim 10, wherein:
said first flexible attachment means comprises a first cable and a second cable;
said first cable connecting an upper end of said leading edge of said first vane to said right side of said vehicle and said second cable connecting a lower end of said leading edge of said first vane to said right side of said vehicle; and
said second flexible attachment means comprises a third cable and a fourth cable;
said third cable connecting an upper end of said leading edge of said second vane to said left side of said vehicle and said fourth cable connecting a lower end of said leading edge of said second vane to said left side of said vehicle.

14. The apparatus of claim 10, wherein:
said first flexible attachment means comprises a first cable and a second cable;
said first cable connecting an upper end of said leading edge of said first vane to a first bolt on said right side of said vehicle and said second cable connecting a lower end of said leading edge of said first vane to a second bolt on said right side of said vehicle; and said second flexible attachment means comprises a third cable and a fourth cable;

said third cable connecting an upper end of said leading edge of said second vane to a third bolt on said left side of said vehicle and said fourth cable connecting a lower end of said leading edge of said second vane to a fourth bolt on said left side of said vehicle.

15. The apparatus of claim 10, wherein the vehicle is an unpowered vehicle adapted to be towed by a second powered vehicle.

16. The apparatus of claim 15, wherein the vehicle is a trailer.

17. The apparatus of claim 15, wherein the vehicle is a railroad car.

18. The apparatus of claim 15, wherein the vehicle is a powered vehicle.

19. A method of modifying a vehicle having a substantially planar generally planar rear surface so as to reduce drag on the vehicle, said method comprising the steps of:

preparing a first vane having a leading edge and a trailing edge;

connecting said leading edge of said first vane to a first side of said vehicle by means of at least one first flexible pliant attachment means;

connecting said trailing edge of said first vane to said rear surface of said vehicle by means of at least one second flexible attachment means;

wherein said first vane redirects air flowing along said first side of said vehicle into a volume of low pressure air behind said rear surface.

20. The method of claim 19, wherein said first flexible attachment means comprises a first side cable which connects the upper end of said leading edge of said first vane to said first side of said vehicle; and a second side cable which connects the lower end of said leading edge of said first vane to said first side of said vehicle.

21. The method of claim 19, wherein said first flexible attachment means comprises a side mesh which connects the leading edge of said first vane to said first side of said vehicle.

22. The method of claim 19, wherein said second flexible attachment means comprises a first rear cable which connects the upper end of said trailing edge of said first vane to said rear surface of said vehicle; and a second rear cable which connects the lower end of said trailing edge of said first vane to said rear surface of said vehicle.

23. The method of claim 19, wherein said second flexible attachment means comprises a rear mesh which connects the trailing edge of said first vane to said first side of said vehicle.

24. The method of claim 19, additionally comprising the steps of:

preparing a second vane having a leading edge and a trailing edge;

connecting said leading edge of said second vane to a second side of said vehicle by means of at least one third flexible attachment means;

connecting said trailing edge of said second vane to said rear surface of said vehicle by means of at least one fourth flexible attachment means;

wherein said second vane redirects air flowing along said second side of said vehicle into a volume of low pressure air behind said rear surface.

25. The method of claim 24, wherein said first side of said vehicle is a right side and a second side of said vehicle is a left side.

\* \* \* \* \*